US005717762A

United States Patent [19]

Aihara et al.

[11] Patent Number: 5,717,762

[45] Date of Patent: Feb. 10, 1998

[54] WACS-TYPE MOBILE COMMUNICATION WITH A UNIFIED FRAME FORMAT

[75] Inventors: Makoto Aihara; Kazuaki Sakai, both of Tokyo, Japan

[73] Assignee: NEC Corporation, Tokyo, Japan

[21] Appl. No.: 562,570

[22] Filed: Nov. 24, 1995

[30] Foreign Application Priority Data

Nov. 24, 1994 [JP] Japan .................................... 6-289518

[51] Int. Cl.$^6$ ........................................ H04L 9/00

[52] U.S. Cl. ........................................ 380/49; 380/48

[58] Field of Search .................................. 380/48, 49

[56] References Cited

U.S. PATENT DOCUMENTS

| | | | |
|---|---|---|---|
| 5,237,612 | 8/1993 | Raith | 380/23 |
| 5,361,302 | 11/1994 | Malek et al. | 380/48 |
| 5,365,590 | 11/1994 | Brame | 380/49 |

OTHER PUBLICATIONS

"General Criteria for Version 0.1 Wireless Access Communication Systems (WACS)", BellCore Tehnical Reference TR-INS-001313, Issue 1, Chapter 5, Oct. 1993.

*Primary Examiner*—Thomas H. Tarcza
*Assistant Examiner*—Carmen D. White
*Attorney, Agent, or Firm*—Foley & Lardner

[57] ABSTRACT

In a mobile communication system of the WACS type, frame formats are unified for DSL, HDSL, and DS1 channels. In addition, each novel base station (25) comprises a radio frame number processor for adding, to upward encrypted information data directed from mobile stations (27) towards a base control station (21), a radio frame number which is used in downward encrypted information data transmitted from the base control station to one or more of the mobile stations and may not necessarily be used in each mobile station on issuing the upward encrypted data.

20 Claims, 12 Drawing Sheets

27

WACS-TYPE MOBILE COMMUNICATION WITH A UNIFIED FRAME FORMAT

BACKGROUND OF THE INVENTION

This invention relates to mobile communication for transmitting encrypted information data through, above all, a radio interface between a mobile station and a base station therefor.

A mobile communication system or network of this type is already known. For example, one is specified in Chapter 5 of BellCore Technical Reference TR-INS-001313, Issue 1, Oct. 1993, "General Criteria for Version 0.1 Wireless Access Communication Systems (WACS)".

In the manner which will later be described in greater detail, a mobile communication system comprises a base station interface between a base station and a base control station and a radio interface between the base station and each mobile station. The base control station is connected to a fixed communication network. Each of the base control station and the mobile station or stations comprises a terminating unit for terminating encrypted information data sent through the base station interface to and from the base station and through the radio interface from and to the mobile station in a time division multiplex fashion. Being processed in a station, such encrypted information data are herein called station encrypted information data. The base station comprises a transmitting unit for transmitting the station encrypted information data through the radio interface.

The base station interface comprises a digital transmission channel for transmitting base station interface encrypted information data of a predetermined transmission capacity in accordance with a frame format or structure. More particularly, the data are transmitted in multiframes. It is possible to understand that each multiframe is composed of at least one submultiframe. Each submultiframe is composed of twenty frames. Each frame is composed of first through N-th bits, where N represents a predetermined bit number. The first bit is used as a frame synchronizing bit between the base station and the base control station. The second through the N-th bits have been used in different manners depending on types of the digital transmission channel.

The predetermined transmission capacity is typically one of 144 kbit/s, 776 kbit/s, and 1.544 Mbit/s. In correspondence, the digital transmission channel is one of three "digital subscriber lines" (hereafter referred to collectively as a DSL channel), a "high bit-rate digital subscriber line" (hereafter called an HDSL channel), and a "digital subscriber line 1" (hereafter called a DS1 channel). When either the HDSL channel or the DS1 channel is used, the frame comprises an additional bit which precedes the first bit for use as a framing bit of the HDSL or the DS1 channel and will herein be called a zeroth bit.

In conventional frame formats or structures for these channels with the zeroth bit of each frame excluded from consideration, it is possible to understand that each multiframe is composed of a single submultiframe in the DSL and the HDSL channels and of first and second submultiframes in the DS1 channel, the second submultiframe succeeding the first submultiframe in each multiframe. For the DSL channel, the predetermined bit number is equal to eighteen and is equal to ninety-six for each of the HDSL and the DS1 channels. For the DS1 channel, the first through the N-th bits of the second submultiframe are ninety-seventh through one hundred and ninety-second bits if the bits in each frame of the multiframe are serially counted with the zeroth bit excluded.

For use in the conventional mobile communication system described in the foregoing, a conventional base station comprises a base station transmitting or receiving and sending unit for transmitting base station encrypted information data from and to the base station interface in base station interface encrypted information data. A radio interface transmitting or receiving and sending unit transmits mobile station encrypted information data to and from the radio interface in radio interface encrypted information data. A base station conversion processing unit processes conversion between the base station interface and the radio interface encrypted information data.

For use in the conventional mobile communication system, a conventional base control station comprises a base station interface transmitting unit for transmitting control station encrypted information data to and from the base station interface in base station interface encrypted information data. A control station encryption processing unit processes conversion between user's and control information data and the control station encrypted information data. A control station conversion processing or control station number processing unit processes conversion between the control station encrypted information data and the base station interface encrypted information data by using radio frame numbers.

For use in the conventional mobile communication system, a conventional mobile station comprises a radio interface transmitting unit for transmitting mobile station encrypted information data to and from the radio interface in radio interface encrypted information data. A mobile station encryption processing unit processes conversion between user's and control information data and the mobile station encrypted information data. A mobile station conversion processing unit processes conversion between the mobile station encrypted information data and the radio interface encrypted information data by using radio frame numbers.

The conventional mobile communication system may comprise an interface conversion unit in the base station interface. The interface conversion unit is used when a predetermined station number of individual base stations are used collectively as the above-mentioned base station. The individual base stations will hereafter be referred to simply as base stations. The interface conversion unit is therefore interposed between the base stations and the base control station and divides the base station interface into a base station side interface connected to each base station and a control station side interface connected to the base control station.

For a conventional interface conversion unit, the base and the control station side interfaces may comprise a common digital transmission channel. Alternatively, the base and the control station side interfaces comprise different digital transmission channels. In any event, the base station side interface is for a base station side interface encrypted information data of a base station side frame format. The control station side interface is for a control station side interface encrypted information data of a control station side frame format. Depending on the circumstances, the interface conversion unit may be included in the base control station with the control station side interface of a negligible interface length. Such an interface conversion unit is used when a base station frame format and a control station frame format are used in the base stations and in the base control station for the base station encrypted information data and for the control station encrypted information data described before, respectively. Under the circumstances, the interface conversion unit processes conversion between the base station side frame format for the base station frame format and the control station frame format used as the control station side frame format.

It would have been noticed in the foregoing that parts in different stations are referred to by using a common name. For example, the base station interface transmitting unit is used in both the base station and the base control station. In the base and the base control stations, the base station interface transmitting units are different units. The common name is, however, used because it is believed that this would give rise to no confusion.

In the conventional mobile communication system, no attention has been directed to unity of the frame formats used in different types of the base station interface, namely, used in the DSL channel or channels, the HDSL channel, and the DS1 channel. As a result, it has been unavoidable for the base station and the base control station to use particular control of the base station interface depending on the types of the base station interface. It has also been indispensable for the interface conversion unit to resort to specific control on processing conversion between the base station side frame format and the control station side frame format.

Furthermore in the conventional mobile communication system, the user's information data and the control information data have been encrypted on the radio interface, namely, into the radio interface encrypted information data, in the base and the mobile stations by using the radio frame numbers and by sending the radio frame numbers from the base control station to the base station on the base station interface or on the control and the base station side interfaces. The conventional base station does not, however, send the radio station numbers to the base control station as the base station interface or on the base and the control station side interfaces. Whereas, a difference may be present in a propagation delay between a plurality of transmission lines of the base station interface. Under the circumstances, the radio frame numbers sent from the base control station to the base station and thence to the mobile station may not necessarily be coincident with radio frame numbers which are presumed as presumed frame numbers in the base control station to correspond to the radio frame numbers sent as actual frame numbers from the mobile station to the base station. As a consequence, the control station processing unit did not necessarily process correct conversion from the base station interface encrypted data into the user's information data because the processed frame numbers are used in place of the actual frame numbers.

In the conventional mobile communication network, each mobile station may not use the radio frame numbers on supplying the radio interface with the encrypted information data based on user's information data issued by an attendant to or a user of the mobile station. In this event, the radio frame numbers are transmitted only between the base station and the base control station and unidirectionally from the base station to the mobile station or stations. This has given rise to difficulties for the base station and the base control station to deal with the encrypted information data sent from each mobile station to the base control station.

Due to disadvantages described above, the conventional mobile communication system, the base station, the base control station, the mobile station, and the interface conversion unit have not been capable of correctly operable. In order to somehow put these devices in correct operation, cost has become objectionable. Maintenance and operation of these devices have been troublesome.

SUMMARY OF THE INVENTION

It is consequently an object of the present invention to provide a mobile communication system of a WACS type which is inexpensive and easy to maintain and put in operation and in which it is possible to encrypt user's information data even when radio frame numbers are used as encryption keys.

It is another object of this invention to provide a mobile communication system which is of the type described and for which a unified frame format is used on transmitting encrypted information data on a base station interface.

It is a different object of this invention to provide a base station which is for use in a mobile communication system of the type described and which is inexpensive and is easy to maintain and to put in correct operation.

It is another different object of this invention to provide a base control station which is for use in a mobile communication system of the type described and which is inexpensive and is easy to maintain and put in correct operation.

It is still another different object of this invention to provide a mobile station which is for use in a mobile communication system of the type described and which is inexpensive and is easy to maintain and put in correct operation.

It is yet another different object of this invention to provide an interface conversion unit which is for use in a mobile communication system of the type described and which is inexpensive and is easy to maintain and put in correct operation.

Other objects of this invention will become clear as the description proceeds.

In accordance with an aspect of this invention, there is provided a mobile communication system comprising a base station interface between a base station and a base control station connected to a fixed communication network and a radio interface between the base station and a mobile station, the base control station and the mobile station comprising terminating means for terminating station encrypted information data sent through the base station interface to and from the base control station and through the radio interface from and to the mobile station in a time division multiplex access fashion, the base station comprising transmitting means for transmitting the station encrypted information data through the radio interface, the base station interface comprising a digital transmission channel for transmitting base station interface encrypted information data of a predetermined transmission capacity in multiframes, each multiframe being composed of at least one submultiframe, each submultiframe being composed of first through twentieth frames, each frame being composed of first through N-th bits, where N represents a predetermined bit number, the first bit being used as a frame synchronizing bit between the base station and the base control station, wherein the second through the N-th bits are used in transmitting the station encrypted information data through the base station interface and the radio interface.

In accordance with a different aspect of this invention, there is provided a base station for use in a mobile communication system comprising a base station interface between the base station and a base control station connected to a fixed communication network and a radio interface between the base station and a mobile station, the base station comprising base station interface transmitting means for transmitting base station encrypted information data from and to the base station interface in base station interface encrypted information data, radio interface transmitting means for transmitting mobile station transmission information data to and from the radio interface in radio interface encrypted information data, and base station conversion processing means for processing conversion between the base station encrypted information data and the base station transmission information data, wherein the base station conversion processing means comprises radio frame number processing means for processing radio frame numbers in the base station encrypted information data and in the base station transmission information data.

In accordance with another different aspect of this invention, there is provided a base control station for use in a mobile communication system comprising a base station interface between a base station and the base control station with the base control station connected to a fixed communication network and a radio interface between the base station and a mobile station, the base control station comprising base station interface transmitting means for transmitting control station encrypted information data to and from the base station interface in base station interface encrypted information data, control station encryption processing means for processing conversion between user's and control information data and control station transmission information data, and control station conversion processing means for processing conversion between the control station encrypted information data and the control station transmission information data by using radio frame numbers, wherein the control station conversion processing means comprises radio frame number processing means for processing the radio frame numbers in the base station interface encrypted information data and for the user's and control information data.

In accordance with still another different aspect of this invention, there is provided a mobile station for use in a mobile communication system comprising a base station interface between a base station and a base control station connected to a fixed communication network and a radio interface between the base station and the mobile station, the mobile station comprising radio interface transmitting means for transmitting mobile station encrypted information data to and from the radio interface in radio interface encrypted information data, mobile station encryption processing means for processing conversion between user's and control information data and mobile station transmission information data and mobile station conversion processing means for processing conversion between the mobile station encrypted information data and the mobile station transmission information data by using radio frame numbers, wherein the mobile station conversion processing means comprises radio frame number processing means for allowing use of any one of the radio frame numbers on processing conversion from the user's and control information data to the mobile station transmission information data.

In accordance with yet another different aspect of this invention, there is provided an interface conversion unit for use in a mobile communication system comprising a base station interface between a predetermined station number of base stations and a base control station connected to a fixed communication network and a radio interface between each of the base station and a mobile station, the interface conversion unit being interposed between the base stations and the base control station to divide the base station interface into a base station side interface connected to each base station for a base station side interface encrypted information data of a base station side frame format and a control station side interface for a control station side interface encrypted information data of a control station side frame format for conversion between the base and the control station side formats, wherein the interface conversion unit comprises frame format converting means for conversion between a first plurality of submultiframes of the base station side frame format and a second plurality of submultiframes of the control station side frame format, where the second plurality is equal to the first plurality times the predetermined station number in each multiframe.

DESCRIPTION OF THE PREFERRED EMBODIMENT

Figure 1:
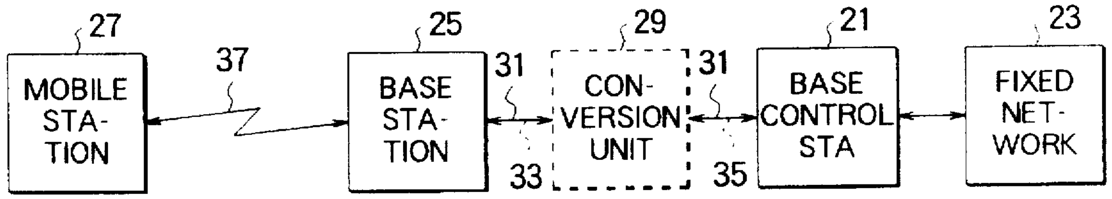
FIG. 1 is a block diagram of a general mobile communication system to which the instant invention is applicable.

Some of the drawing figures mentioned above correspond as follows to the figures in the Chapter 5 cited heretobefore.

Figure 3:
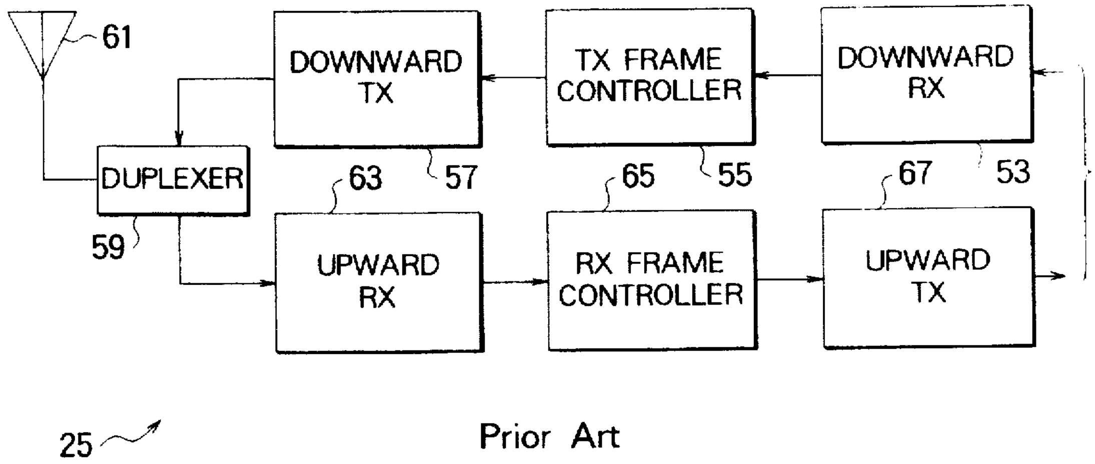
Prior Art FIG. 3
FIG. 3 is a block diagram of a conventional base station for use in the mobile communication system shown in FIG. 1.
Figure 4:
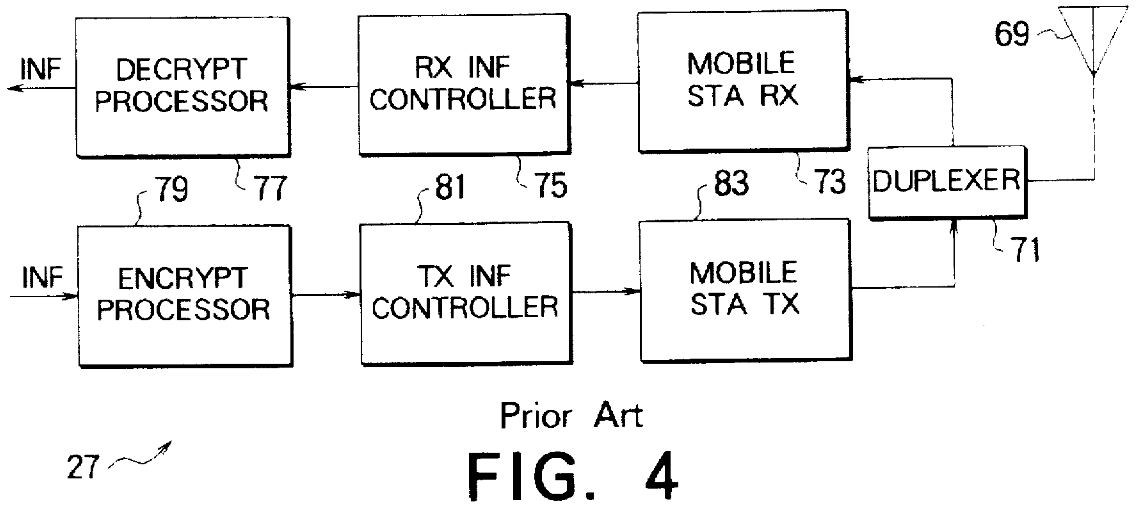
Prior Art FIG. 4
FIG. 4 is a block diagram of a conventional mobile station for use in the mobile communication system illustrated in FIG. 1.
Figure 5:
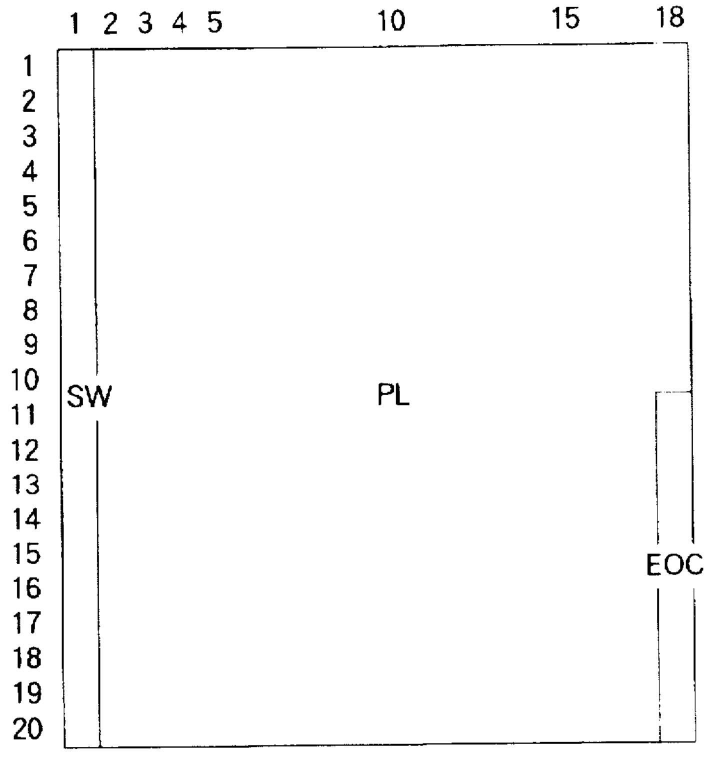
Prior Art FIG. 5
FIG. 5 is a schematic representation of a conventional frame format of a base station interface encrypted information data used in the mobile communication system illustrated in FIG. 1.

FIG. 1 to FIG. 5.0-1 and FIG. 5.3-1; FIG. 5 to FIG. 5.3-12; and FIGS. 6 and 7 to FIG. 5.3-6.

Referring to FIG. 1, a mobile communication system comprises in general a predetermined station number of base stations and a base control station 21 connected to an exchange office (not shown) of a fixed communication network 23. In the example being illustrated, a base station 25 is depicted. In a service area of the base station 25, a plurality of mobile stations are present either moving or in standstill. As a representative of the mobile stations, a mobile station 27 is depicted. Between the base station 25 and the base control station 21, the mobile communication system may comprise an interface conversion unit 29 which is illustrated in FIG. 5.4-1 of the above-mentioned Chapter 5.

The mobile communication system comprises a base station interface 31 between the base station 25 and the base control station 21. When used, the interface conversion unit 29 divides the base station interface 31 into a base station side interface 33 connected to each of the base stations, such as the base station 25, and a control station interface 35 connected to the base control station 21. A radio interface 37 is between the base station 25 and each of the mobile stations, such as the mobile station 27. Such interfaces 31, 33, 35, and 37 are for transmitting various signals in the manner described in the following. When transmitted from the fixed communication network 23 to the base control station 21, therefrom to the base station 25, and thence to the mobile station 27, the signal will herein be called a downward (going or sent) signal. When propagated from the mobile station 27 towards the fixed communication network 23, the signal will be called an upward signal. When destined to another mobile station currently present in the service area of the base station 25, an upward signal may be sent from the base station 25 to this other mobile station as the downward signal.

It will be presumed for the time being that the interface conversion unit 29 is not interposed in the base station interface 31. In this event, the base station interface 31 comprises a digital transmission channel of a predetermined data transmission capacity. Typically, the base station interface is composed of three DSL (digital subscriber lines) channels, each having the transmission capacity of 144 kbit/s. Alternatively, the base station interface 31 is composed of one HDSL (high bit-rate digital subscriber line) channel of 766 kbit/s. As a further alternative, the base station interface 31 is composed of one DS1 (digital subscriber line 1) channel of 1.544 Mbit/s.

Figure 2:
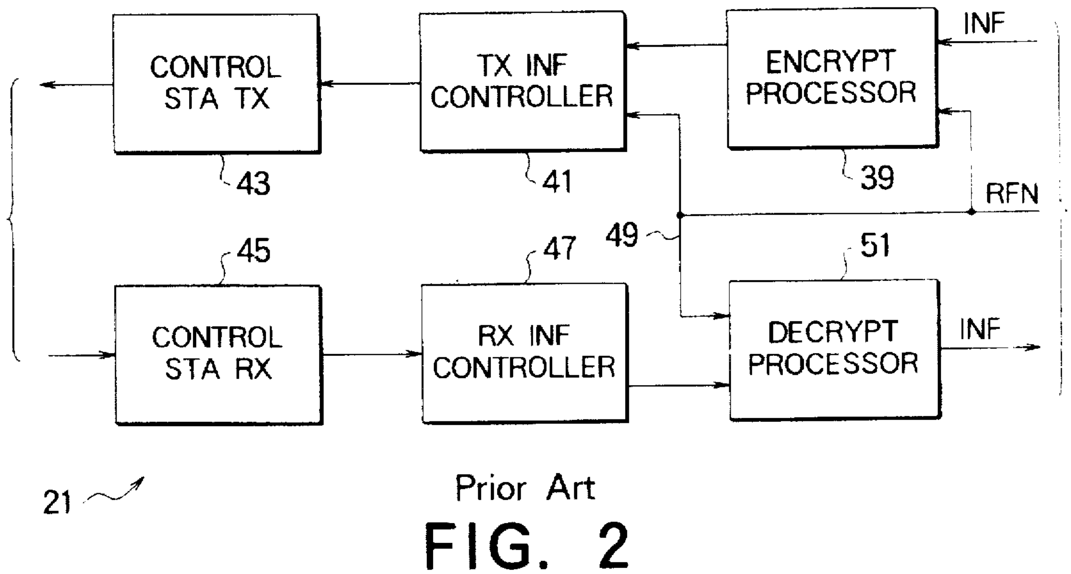
Prior Art FIG. 2
FIG. 2 is a block diagram of a conventional base control station for use in the mobile communication system depicted in FIG. 1.

Referring to FIG. 2 with FIG. 1 continuously referred to, a conventional base control station 21 comprises a control station encrypt processor 39 supplied with downward radio frame numbers (RFN) and downward user's and control information data (INF). In general, the downward user's information data are sent from the fixed communication network 23 by users of the network 23. Together with the downward control information data, the downward radio frame numbers may be generated in the base control station 21. Using the downward radio frame numbers as encrypting keys, the encrypt processor 39 encrypts the downward user's and control information data into control station downward transmission information data.

A control station transmission information controller 41 compiles the control station downward transmission information data and the downward radio frame numbers into downward control station encrypted information data in compliance with a base station interface frame format or structure which will presently be described. A control station transmitter 43 sends the downward control station encrypted information data to the base station interface 31 as downward base station interface encrypted information data.

From the base station interface 31, a control station receiver 45 receives upward base station interface encrypted information data as upward control station encrypted information data. By using presumed frame numbers, a control station reception information controller 47 separates upward encrypted user's and control information data from the upward control station encrypted information data as control station upward transmission information data. Supplied through a connection 49 with the downward radio frame numbers as decrypting keys, a control station decrypt processor 51 decrypts the upward encrypted user's and control information data into upward user's and control information data. The upward user's information data are sent in general to the fixed communication network 23. For use as the presumed frame numbers in the reception information controller 47, the downward radio frame numbers are used besides in the encrypt processor 39, the transmission information controller 41, and the decrypt processor 51.

Referring to FIG. 3 with FIGS. 1 and 2 continuously referred to, the base station 25 comprises a base station downward receiver 53 for receiving the downward control station encrypted information data from the base station interface 31 as downward base station encrypted information data. A base station transmission frame controller 55 processes the downward base station encrypted information data into base station downward transmission information data by recompiling the base station interface frame format into a radio interface format.

A base station downward transmitter 57 feeds the base station downward transmission information data through a base station duplexer 59 to a base station antenna 61 as downward radio interface encrypted information data. The antenna 61 propagates the downward radio interface encrypted information data to the radio interface 37.

Through the radio interface 37, the base station antenna 61 receives upward radio interface encrypted information data. Connected to the base station duplexer 59, a base station upward receiver 63 receives the upward radio interface encrypted information data as base station upward transmission information data. A base station reception frame information controller 65 processes the base station upward transmission information data into upward base station encrypted information data. A base station upward transmitter 67 transmits the upward base station encrypted information data to the base station interface 31 as the upward base station interface encrypted information data.

Referring to FIG. 4 with FIGS. 1 and 2 continuously referred to, the mobile station 27 comprises a mobile station antenna 69 connected to a mobile station duplexer 71. The mobile station antenna 69 is for catching the downward radio interface encrypted information data propagated through the radio interface 37 from the base station 25 and for propagating the upward radio interface encrypted information data to the radio interface 37 and thence directed to the base station 25.

Connected to the mobile station duplexer 71, a mobile station receiver 73 receives as downward mobile station encrypted information data the downward radio interface encrypted information data directed to the mobile station 27 being illustrated. A mobile station reception information controller 75 processes the downward mobile station encrypted information data into mobile station downward transmission information data in which the user's information data may be encrypted at the base control station 21 by using the downward radio frame numbers. A mobile station decrypt processor 77 decrypts the mobile station downward transmission information data by the downward radio frame numbers for use by an attendant to the mobile station 27 into the user's information data which may be initiated by a user in the fixed communication network 23.

In the mobile station 27, a mobile station encrypt processor 79 processes upward user's information data supplied thereto by the attendant and upward control information data into mobile station upward transmission information data by using upward radio frame numbers which will presently be described. A mobile station transmission controller 81 compiles the upward transmission information data and the upward radio frame numbers into upward mobile station encrypted information data. Connected to the mobile station duplexer 71 and to the mobile station transmission controller 81, a mobile station transmitter 83 feeds the upward mobile station encrypted information data to the mobile station antenna 69 as the upward radio interface encrypted information data.

In FIGS. 1 through 4, the mobile station reception information controller 75 comprises a memory device (not shown) for keeping, as a stored frame number, one of the downward radio frame numbers that is processed thereby at a time instant. A predetermined time interval after the time instant, the memory device may supply the stored frame number to the mobile station encrypt processor 79 for use as an upward radio frame number. In the upward control station encrypted information data, this upward radio frame number reaches the control station reception information controller 47. A time difference between use of the above-mentioned one of the downward radio frame numbers in the control station transmission information controller 41 and arrival of the upward radio frame number at the control station reception information controller 47 depends on a propagation delay which is unavoidable in the radio interface 37. It has consequently been necessary to use the presumed frame number in the control station reception information controller 47.

Turning to FIG. 5 with FIGS. 1 through 4 continuously referred to, a conventional frame format or structure will be described for the station and the interface encrypted information data in connection with each multiframe for the DSL channel. Each multiframe has a multiframe duration of 2.5 ms and is composed of first through twentieth frames indicated vertically along a left side, each having a frame length of 125 microseconds.

Each frame is composed of first through eighteenth bits indicated horizontally along a top side. In each of the first through the twentieth frames, the first bit is used as a frame synchronizing bit or word (sw) between the base station 25 and the base control station 21. The second through the eighteenth bits in each of the first through the tenth frames and the second through the seventeenth bits in each of the eleventh through the twentieth frames are used for payload (PL) primarily on the radio interface encrypted information data. In each of the eleventh through the twentieth frames, the eighteenth bit is used as a maintenance bit (EOC) between the base station 25 and the base control station 21.

In the manner which will later become clear, the payload comprises, in the radio interface encrypted information data, the user's information data and the control information data. Radio frame numbers (RFN) are transmitted as parts of the control information data through the base station interface 31 from the base control station 21 to the base station 25 and not from the base station 25 to the base control station 21.

Further turning to FIG. 6 with FIGS. 1 through 4 continuously referred to, a conventional frame format will be described for the station and the interface encrypted information data in connection with each multiframe for the HDSL channel. Each multiframe has a frame duration of 2.5 ms and is composed of first through twentieth frames, each having a frame length of 125 microseconds.

Each frame is composed of first through ninety-seventh bits. In each of the first through the twentieth frames, the first bit is used as a framing bit (F) for the HDSL channel. The second bit is used as a frame synchronizing bit (SW) between the base station 25 and the base control station 21. The third through the tenth bits are used as maintenance bits (EOC) between the base station 25 and the base control station 21. The eleventh through the thirteenth bits are reserved as reservation bits (RES). The fourteenth through the ninety-seventh bits are used for payload (PL) on the radio interface 37. The radio frame numbers are used in the manner described in conjunction with FIG. 5.

Figure 7:
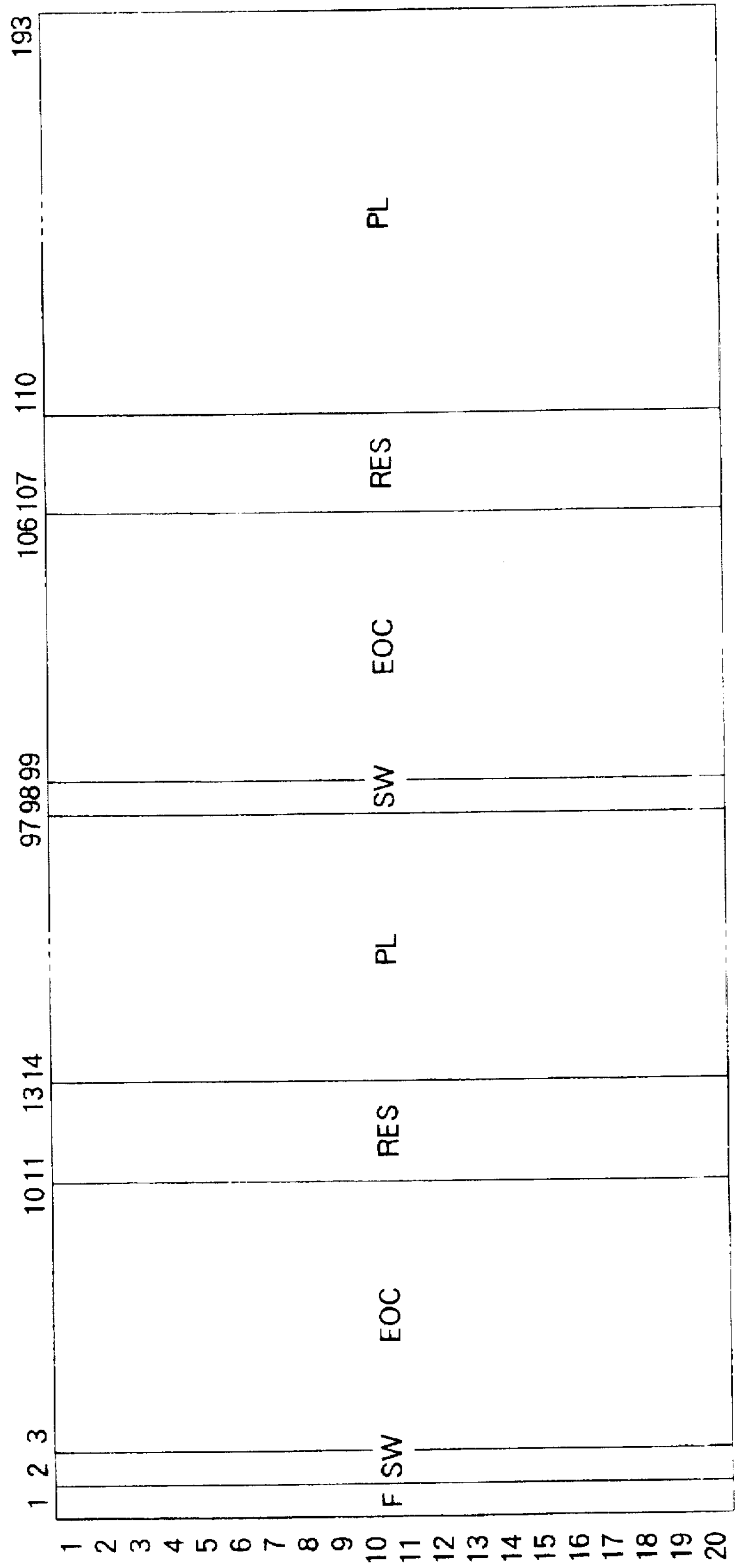
Prior Art FIG. 7
FIG. 7 is still another schematic representation of the conventional frame format depicted in FIG. 5.

Still further turning to FIG. 7 with FIGS. 1 through 4 continuously referred to, a conventional frame format will be described for the station and the interface encrypted information data in connection with each multiframe for the DS1 channel. Each multiframe has a frame duration of 2.5 ms and is composed of first through twentieth frames, each having a frame length of 125 microseconds.

Each frame is composed of first through one hundred and ninety-third bits. The first bit is used as a framing bit (F) for the DS1 channel. The second and the ninety-eighth bits are used as frame synchronizing bits (SW) between the base station 25 and the base control station 21. The third through the tenth bits and the ninety-ninth through the one hundred and sixth bits are used as maintenance bits between the base station 25 and the base control station 21. The eleventh through the thirteenth bits and the one hundred and seventh through the one hundred and ninth bits are reserved as reserved bits (RES). The fourteenth through the ninety-seventh bits and the one hundred and tenth through the one hundred and ninety-third bits are used for payload on the radio interface 37.

The radio frame numbers are used in the manner described in connection with FIG. 5. It is possible to understand when the first bit is excluded from each frame that each multiframe is composed of first and second submultiframes, each composed of ninety-six bits in each of the first through the twentieth frames.

Figure 6:
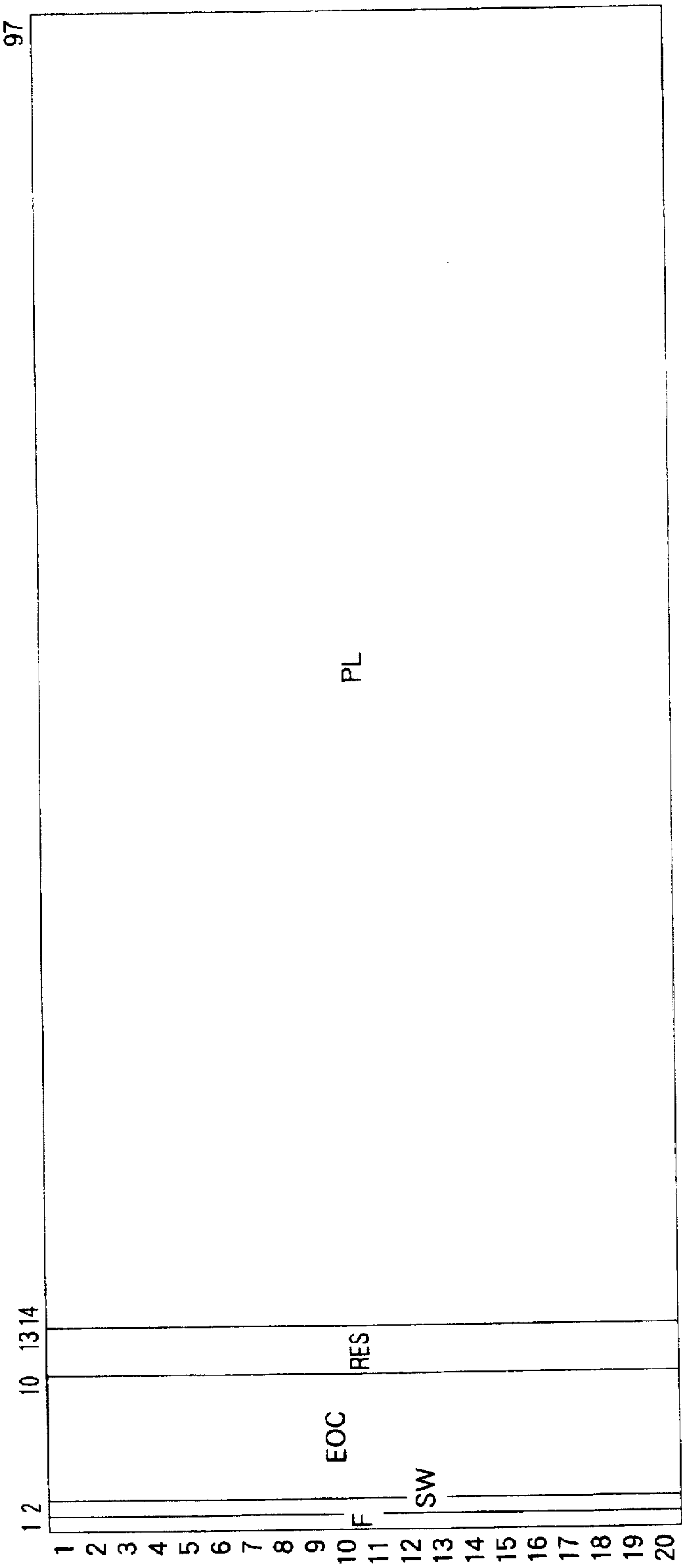
Prior Art FIG. 6
FIG. 6 is another schematic representation of the conventional frame format illustrated in FIG. 5.

Reviewing FIGS. 5 and 6 with FIGS. 1 through 7 continuously referred to, it is possible in FIG. 6 to understand that each multiframe is composed of a single submultiframe comprising ninety-six bits in each of the first through the twentieth frames when the first bit is excluded. It is also possible in FIG. 5 to understand that each multiframe is composed of a single submultiframe consisting of eighteen bits in each of the first through the twentieth frames. Three DSL channels are used collectively as the digital transmission channel of the base station interface 31. Consequently, it would not be difficult for the interface conversion unit 29 to process conversion between the frame formats for the HDSL and the DS1 channels. Conversion between the frame formats for three DSL channels and the HDSL or the DS1 channel has, however, been next to impossible.

Figure 8:
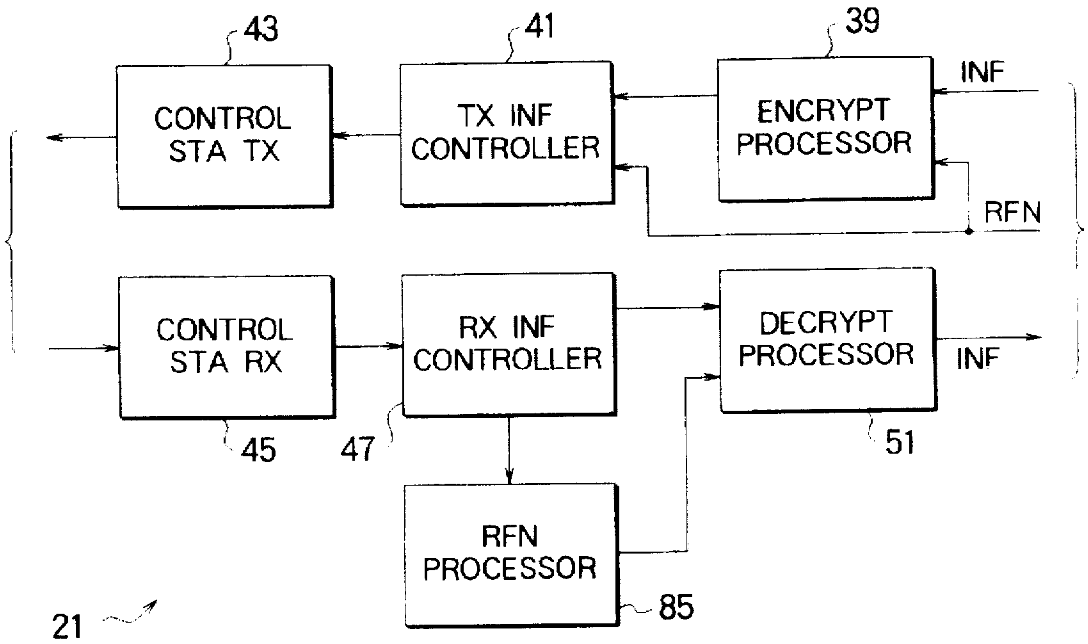
FIG. 8 is a block diagram of a base control station for use in a mobile communication system which is illustrated in FIG. 1 and is according to an embodiment of the instant invention.

Referring now to FIG. 8 with FIG. 1 again referred to, the present invention will be described. Similar or corresponding parts are designated hereafter by like reference numerals and are similarly operable with likewise named signals unless otherwise specifically mentioned. It should be noted throughout the following that the mobile station 27 supplies the radio interface 37 with upward mobile station encrypted information data together with an upward radio frame number in the manner which is described heretobefore and will later be described in greater detail. According to a preferred embodiment of this invention, the mobile communication system is not different in structure from that illustrated before with reference to FIG. 1.

In FIG. 8, a novel base control station 21 does not comprise the connection 49 described in conjunction with FIG. 2 and comprises instead a control station radio frame number processor 85 having a processor input terminal connected to the control station reception information controller 47 and a processor output terminal connected to the control station decrypt processor 51. The reception information controller 47 processes the upward control station encrypted information data into the control station upward transmission or reception information data which are upward user's and control information data encrypted at the mobile station 27. From the upward transmission information data, the radio frame number processor 85 separates or reads the upward radio frame number for supply to the decrypt processor 51. Correctly using the upward radio frame number, the decrypt processor 51 recovers the upward user's and control information data.

Figure 9:
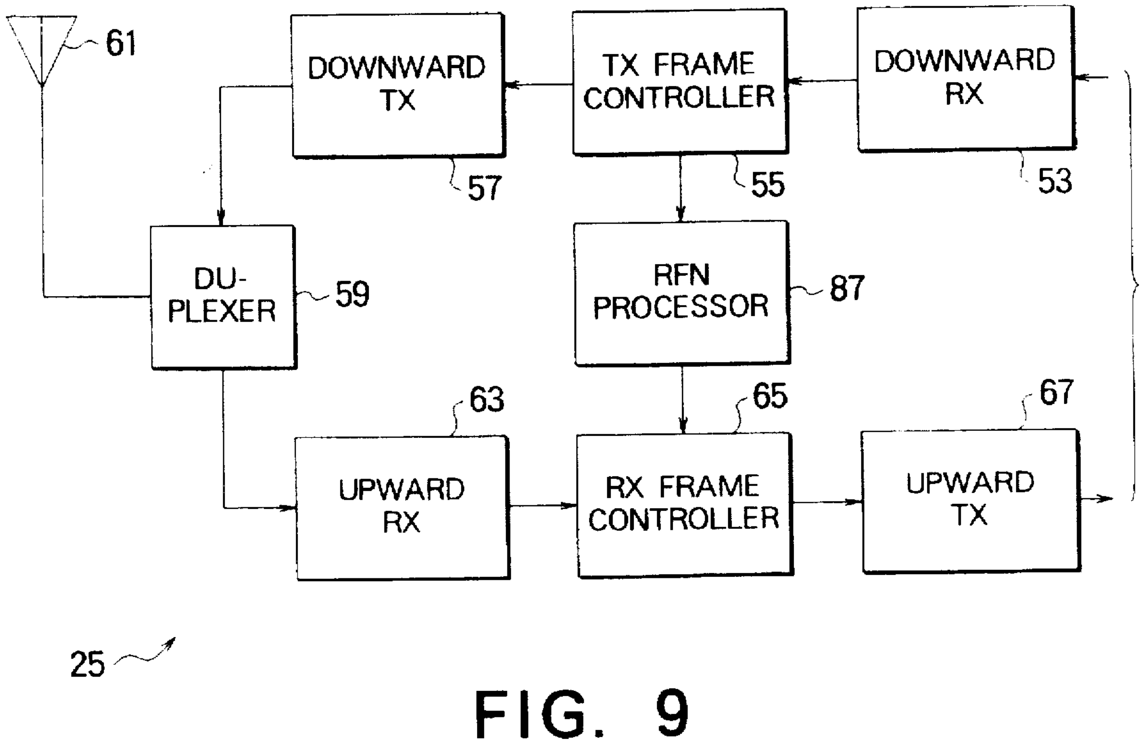
FIG. 9 is a block diagram of a base station for use in the mobile communication system mentioned in conjunction with FIG. 8.

Referring to FIG. 9 with FIGS. 1 and 8 continuously referred to, the base station 25 additionally comprises a base station radio frame number processor 87 between the base station transmission and reception frame controllers 55 and 65. From the downward base station encrypted information data processed by the transmission frame controller 55, the radio frame number processor 87 reads the downward radio frame numbers for storage therein as stored frame numbers. By the reception frame controller 65, the stored frame numbers are added to or used in the base station upward transmission information for conversion into the upward base station encrypted information data.

Figure 10:
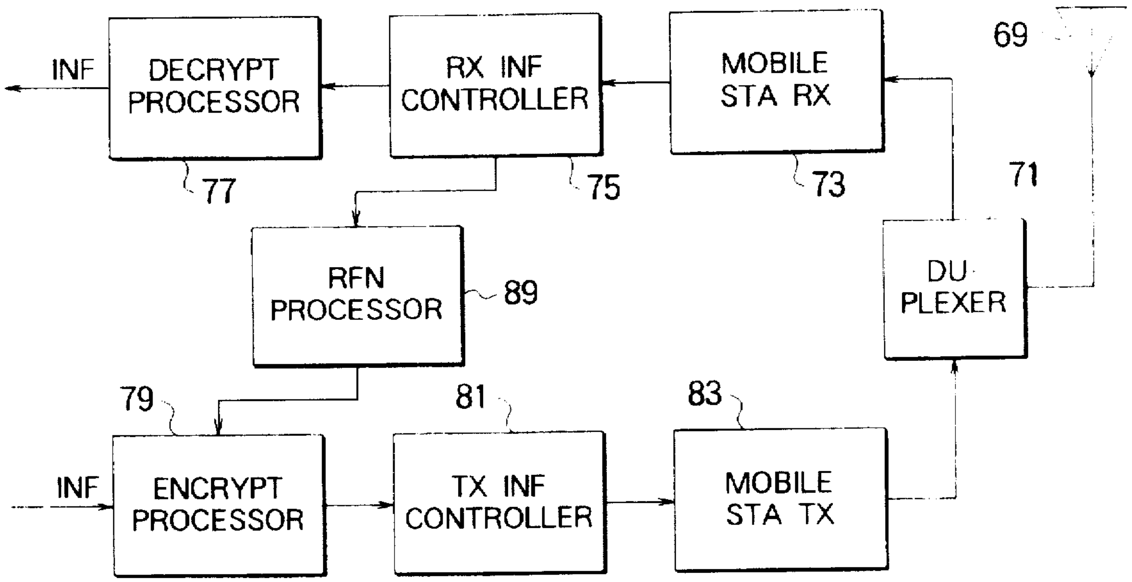
FIG. 10 is a block diagram of a mobile station which may be used in the mobile communication system mentioned in connection with FIG. 8.

Referring to FIG. 10 with FIGS. 1, 8, and 9 continuously referred to, the mobile station 27 may comprise a mobile station radio frame number processor 89 having a processor input terminal connected to the mobile station reception information controller 75 and a processor output terminal connected to the mobile station encrypt processor 79. If used, this radio frame number processor 89 is operable like the base station radio frame number processor 87. The mobile station radio frame number processor 89 allows the mobile station encrypt processor 79 to use any one of the stored frame numbers in encrypting the upward user's information data.

Reviewing FIGS. 1 and 8 through 10, the mobile station 27 need not use the upward radio frame numbers. In this event, the mobile station 27 produces the user's information data the above-mentioned predetermined time interval after the time instant of reception of the downward user's and control information data and sends no upward radio frame number or numbers to the base station 25 through the radio interface 37. Even under the circumstances, the base station radio frame number processor 87 adds the upward radio frame numbers in exact coincidence with the downward radio frame numbers regardless of the difference in the propagation delay.

Figure 11:
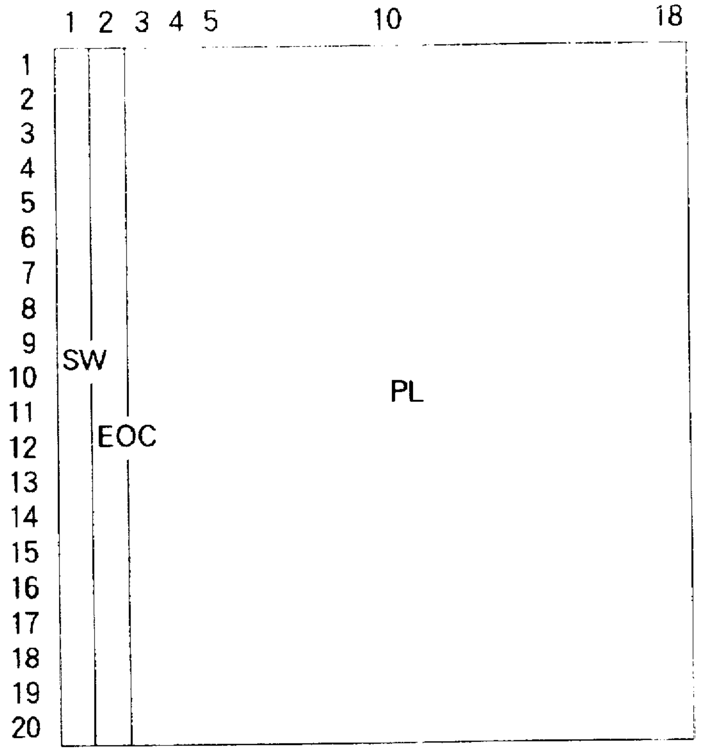
FIG. 11 is a schematic representation of a frame format used for base station interface encrypted information data in the mobile communication system mentioned in conjunction with FIG. 8.

Referring afresh to FIG. 11 with FIGS. 1 and 8 through 10 continuously referred to, a novel frame format or structure corresponds to the conventional frame format illustrated with reference to FIG. 5 and for use in the mobile communication system being illustrated. For use as the frame synchronizing bit, the maintenance bit, the payload, and the like, the bit numbers are additionally indicated in parentheses.

Among the first through the eighteenth bits in each of the first through the eighteenth frames, the first bit is used on the frame synchronizing bit or word (SW) between the base station 25 and the base control station 21. The second bit is used as the maintenance bit (EOC) between the base station 25 and the base control station 21. The third through the eighteenth bits are used for the payload (PL) on the radio interface 37.

Figure 12:
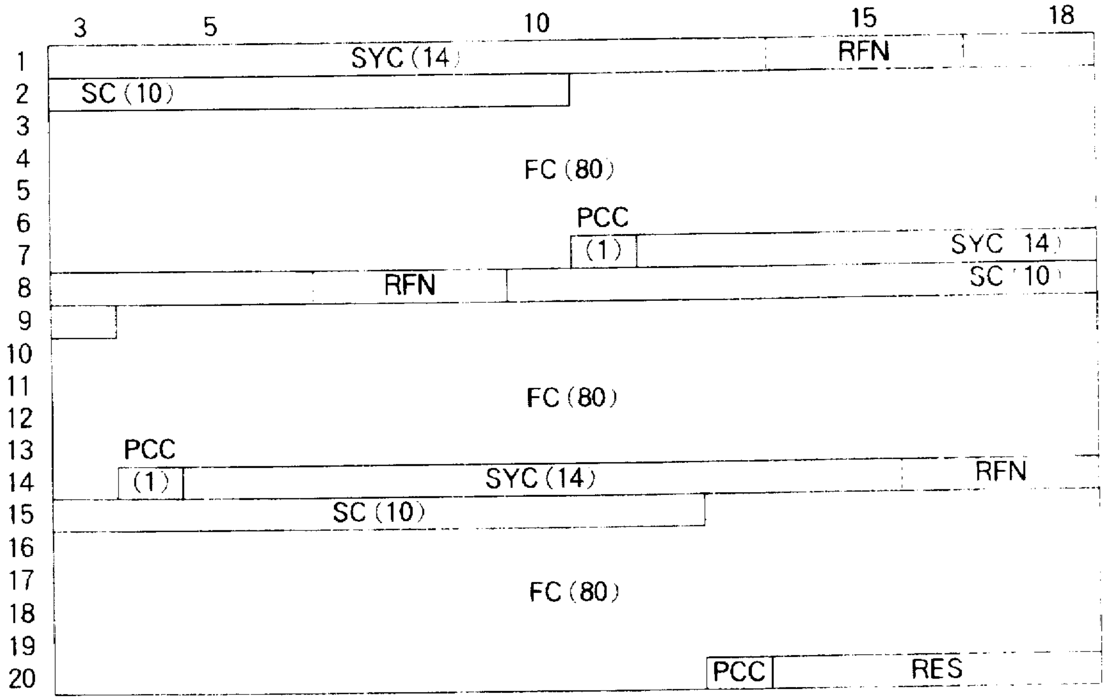
FIG. 12 is a schematic illustration of a detailed format of the frame format depicted in FIG. 11.

Turning to FIG. 12 with FIGS. 1 and 8 through 11 continuously referred to, the payload for the downward information data is depicted in detail in connection with the DSL channel. The third through the eighteenth bits of the first through the nineteenth frames and the third through the thirteenth bits of the twentieth frame are divided into first through third equal parts, each part consisting of one hundred and five bits. In the twentieth frame, the fourteenth through the eighteenth bits are reserved as reservation bits (RES).

In each of the first through the third equal parts, the bits will be counted from the first frame to the twentieth frame and in each frame in the ascending order from the third bit to the eighteenth bit. Starting from each leading end, fourteen bits are used collectively as a synchronizing code (SYC) including three bits which are used to represent the downward radio frame number (RFN). Following these fourteen bits, ten bits are used for slow channel (SC). Further following, eighty bits are used for fast channel (FC). At the end of each part, one bit is used as the power control bit (PCC) for the mobile station 27.

Figure 13:
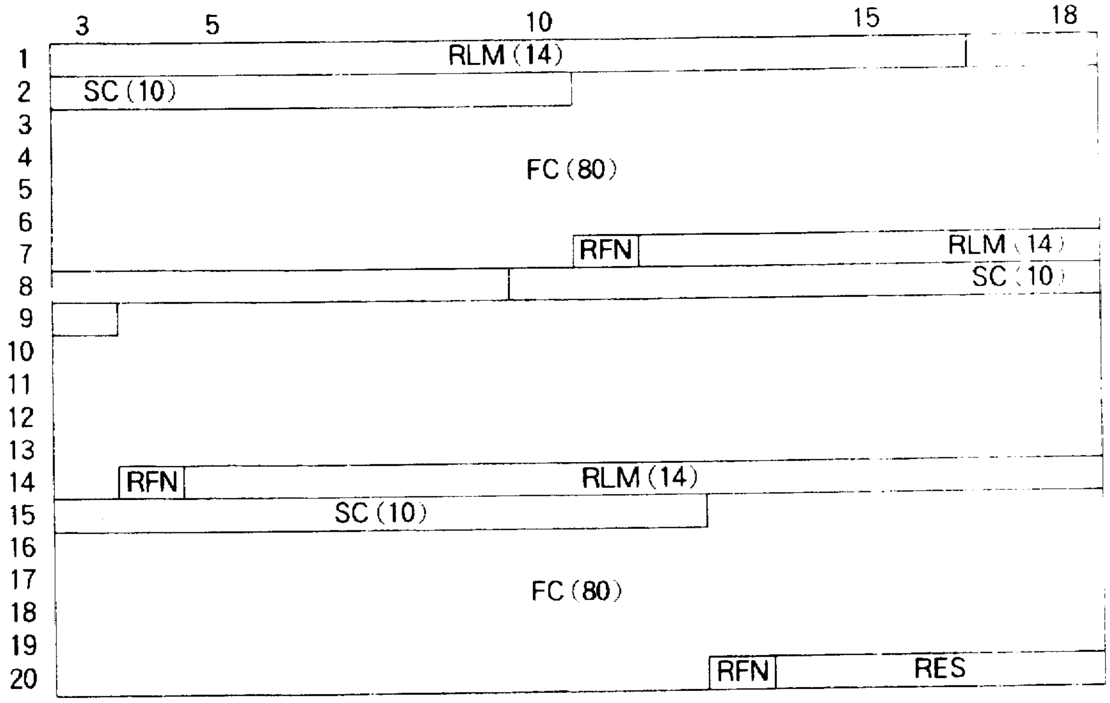
FIG. 13 is a schematic illustration of another detailed format of the frame format shown in FIG. 11.

Further turning to FIGS. 13 with FIGS. 1 and 8 through 12 continuously referred to, the payload for the upward information data is used as follows. The first through the third equal parts are defined like in FIG. 12 with the bits similarly counted in each part.

Fourteen bits are for radio link measurements (RLM) described in the Chapter 5 mentioned hereinabove. Following, ten bits are used for the slow channel (SC). Further following, eighty bits are used for the fast channel (FC). At a trailing end, one bit is used as the upward radio frame number which may be added at the base station 25.

Figure 14:
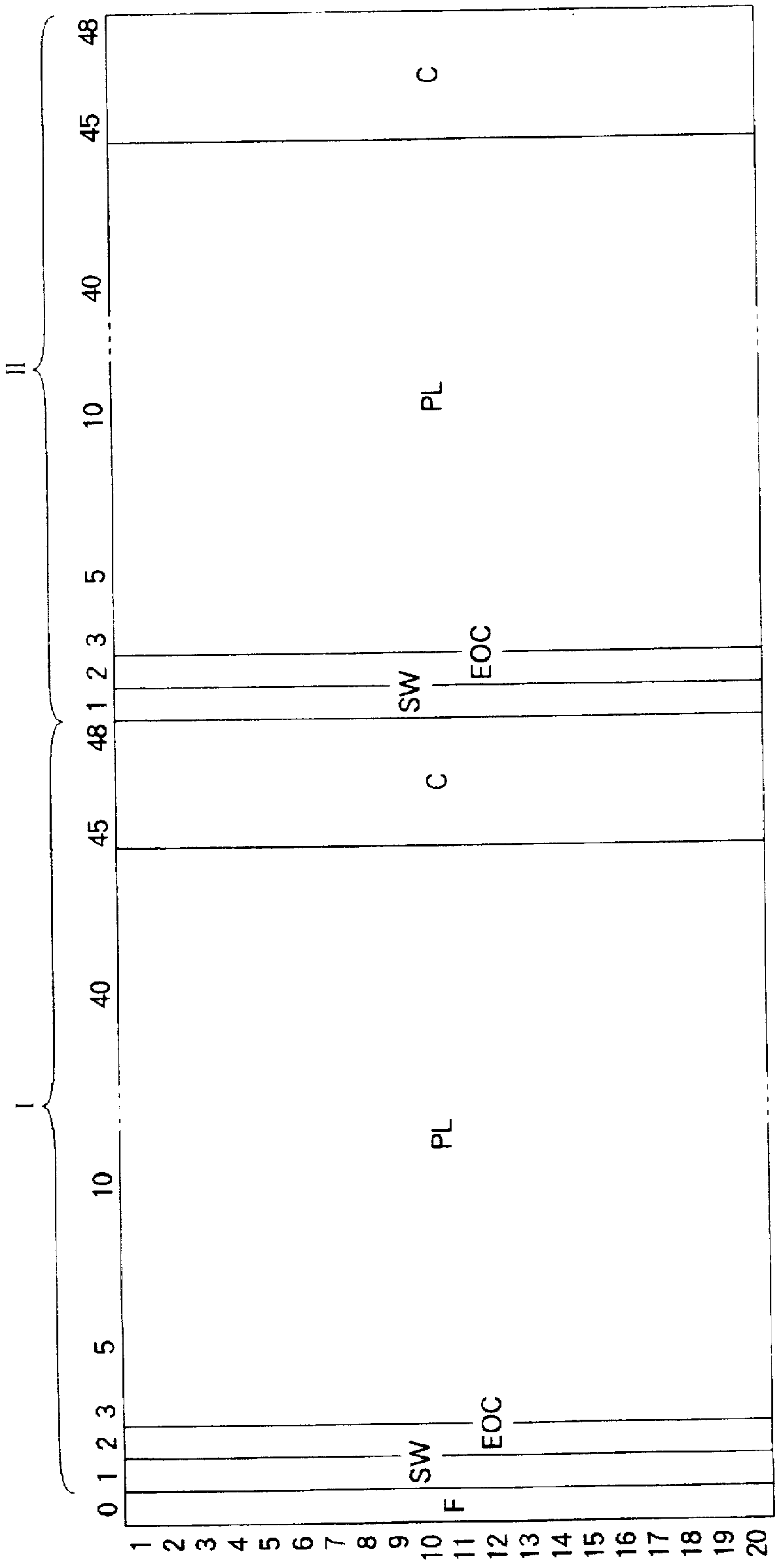
FIG. 14 is another schematic representation of the frame format mentioned in conjunction with FIG. 11.

Referring to FIG. 14 with FIGS. 1 and 8 through 13 continuously referred to, another novel frame format corresponds to the conventional frame format described with reference to FIG. 6. Excluding the youngest or smallest numbered bit which may now be called a zeroth bit in each of the first through the twentieth frames, each multiframe is divisible now into first and second submultiframes I and II, each composed of forty-eight bits in each frame. These bits will be renumbered into first through forty-eighth bits.

In each multiframe, the zeroth bit is used as the framing bit (F) for the HDSL channel. In each of the first and the second submultiframes, the first bit is used as the frame synchronizing bit (SW) between the base station 25 and the base control station 21. The second bit is used as the maintenance bit (EOC) between the base station 25 and the base control station 21. The third through the forty-fourth bits are used for the payload (PL) on the radio interface 37. When the interface conversion unit 29 is used, the forty-fifth through the forty-eighth bits are used as maintenance and control bits (C) therefor. When the interface conversion unit 29 is not used, the forty-fifth through the forty-eighth bits are reserved as the reservation bits.

Figure 15:
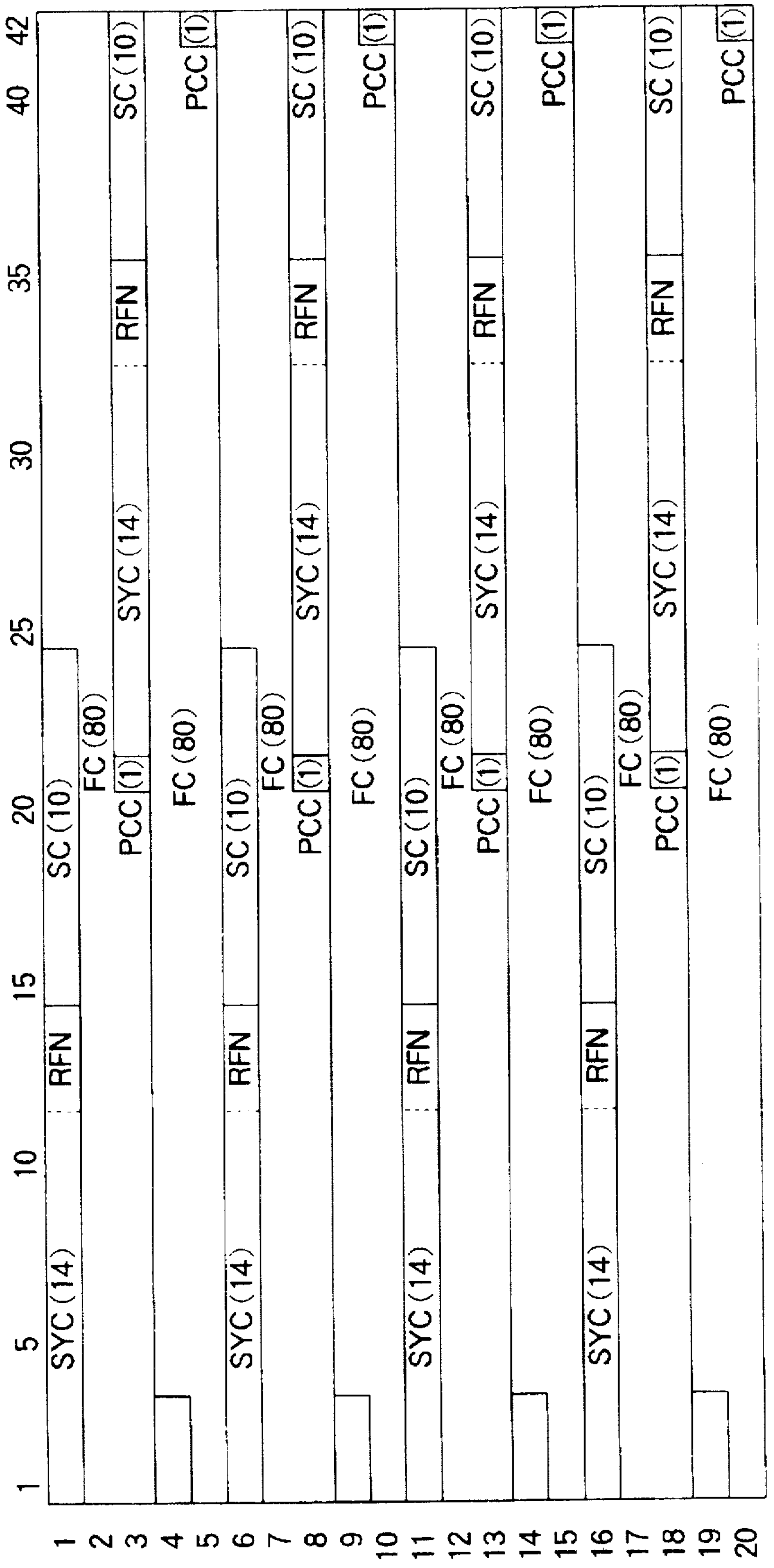
FIG. 15 is a schematic illustration of a detailed format of the frame format depicted in FIG. 14.
Figure 16:
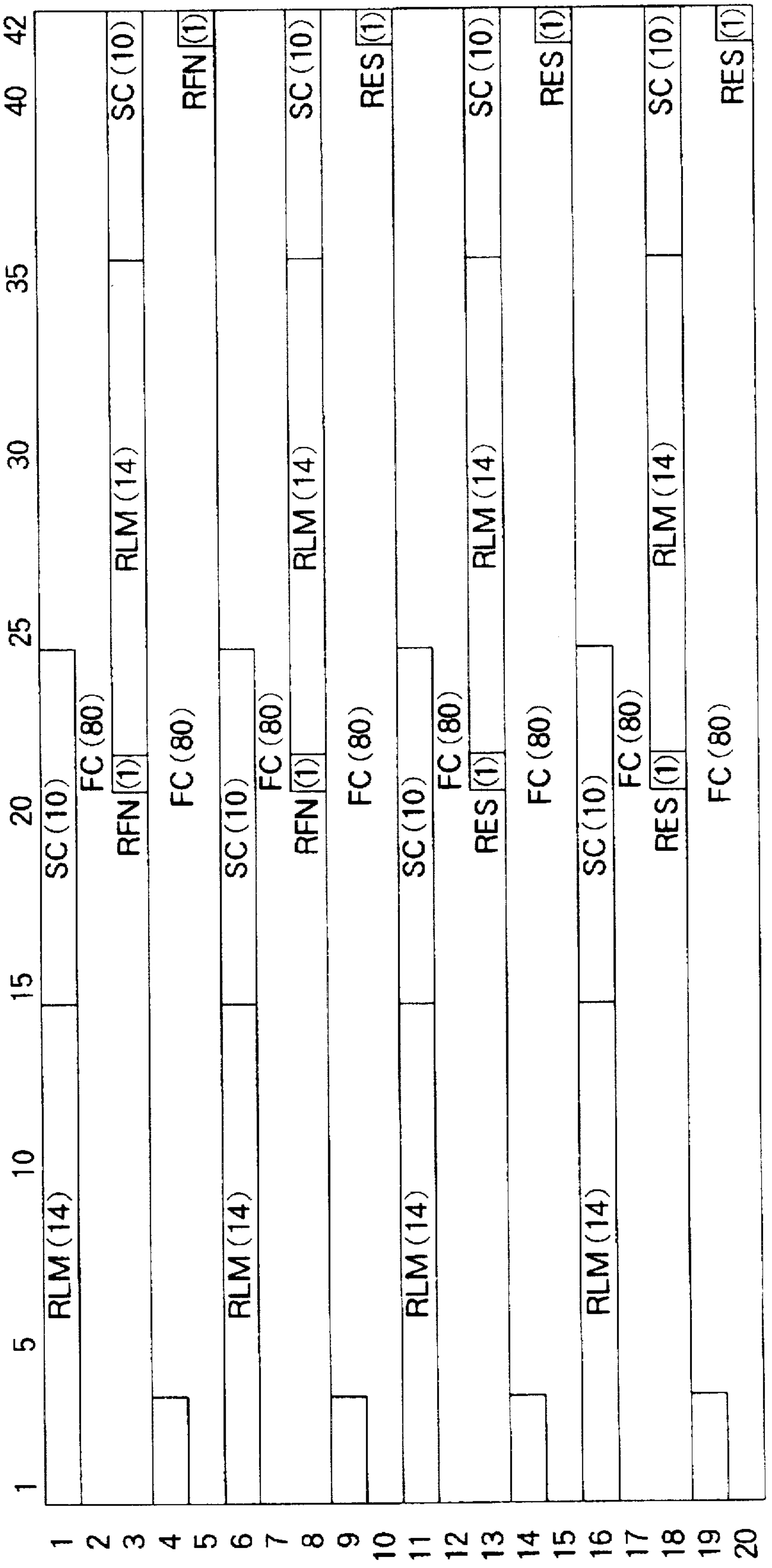
FIG. 16 is a schematic illustration of another detailed format of the frame format shown in FIG. 14.

Turning to FIGS. 15 and 16 with FIGS. 1 and 8 through 14 continuously referred to, the first through the forty-second bits of the first through the twentieth frames are divided into first through eighth equal parts, each consisting of one hundred and five bits. In each of the first through the eighth equal parts, the bit will be counted from the first frame to the twentieth frame and, in each of the frames, from the third bit to the forty-eighth bit. Along a top side of the first through the twentieth frames, these bits are indicated afresh by numbers 1 through 42.

FIG. 15 is a detailed frame format for the payload in the downward information data. As counted starting from a leading end bit of each of the first through the eighth equal parts, fourteen bits are collectively used as the synchronizing code (SYC) including three bits used to represent the downward radio frame numbers. Following, ten bits are used for the slow channel (SC). Further following, eighty bits are used for the fast channel (FC). At the end of each part, one bit is used as the power control bit (PCC) for the mobile station 27.

FIG. 16 shows a detailed frame format for the payload in the upward information data. Starting from a leading bit in each of the first through the eighth equal parts, fourteen bits are used for the radio link measurements (RLM). Following, ten bits are used for the slow channel (SC). Further following, eighty bits are used for the fast channel (FC). When three bits are used for the downward radio frame numbers in the manner described in connection with FIG. 15, a trailing bit in each of the first through the third equal parts is used to indicate the upward radio frame number. Such trailing bits are reserved as the reservation bits (RES) in the fourth through the eighth equal parts.

Figure 17:
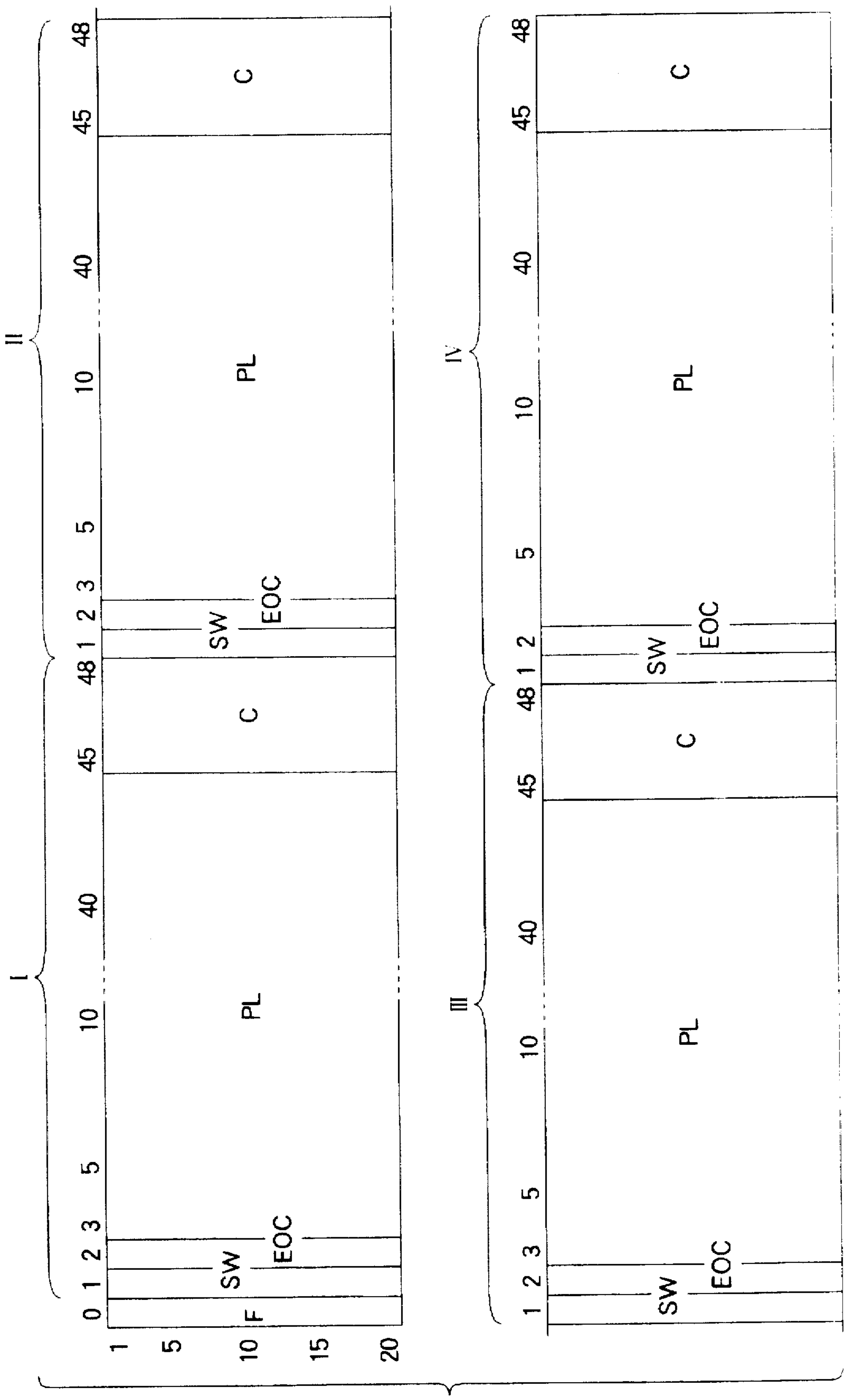
FIG. 17 is still another schematic representation of the frame format mentioned in connection with FIG. 11.

Referring to FIG. 17 with FIGS. 1 and 8 through 16 continuously referred to, still another novel frame format corresponds to the conventional frame format illustrated with reference to FIG. 7. Like in FIG. 13, each multiframe is divided into first through fourth equal parts. In other respects including the detailed frame formats for the payloads in the downward and the upward radio frame numbers, use of individual bits is similar in each of the first through the fourth submultiframes I, II, III, and IV and in each of the first through the eighth equal parts.

Reviewing FIGS. 11 through 17, the novel frame formats are unified in common to each of the three DSL channels, to the HDSL channel, and to the DS1 channel. The detailed frame formats are also unified. The reservation bits are used only where it is indispensable to use. In addition, it is possible to use the reservation bits afresh as the maintenance and control bits for the interface conversion unit 29.

Figure 18:
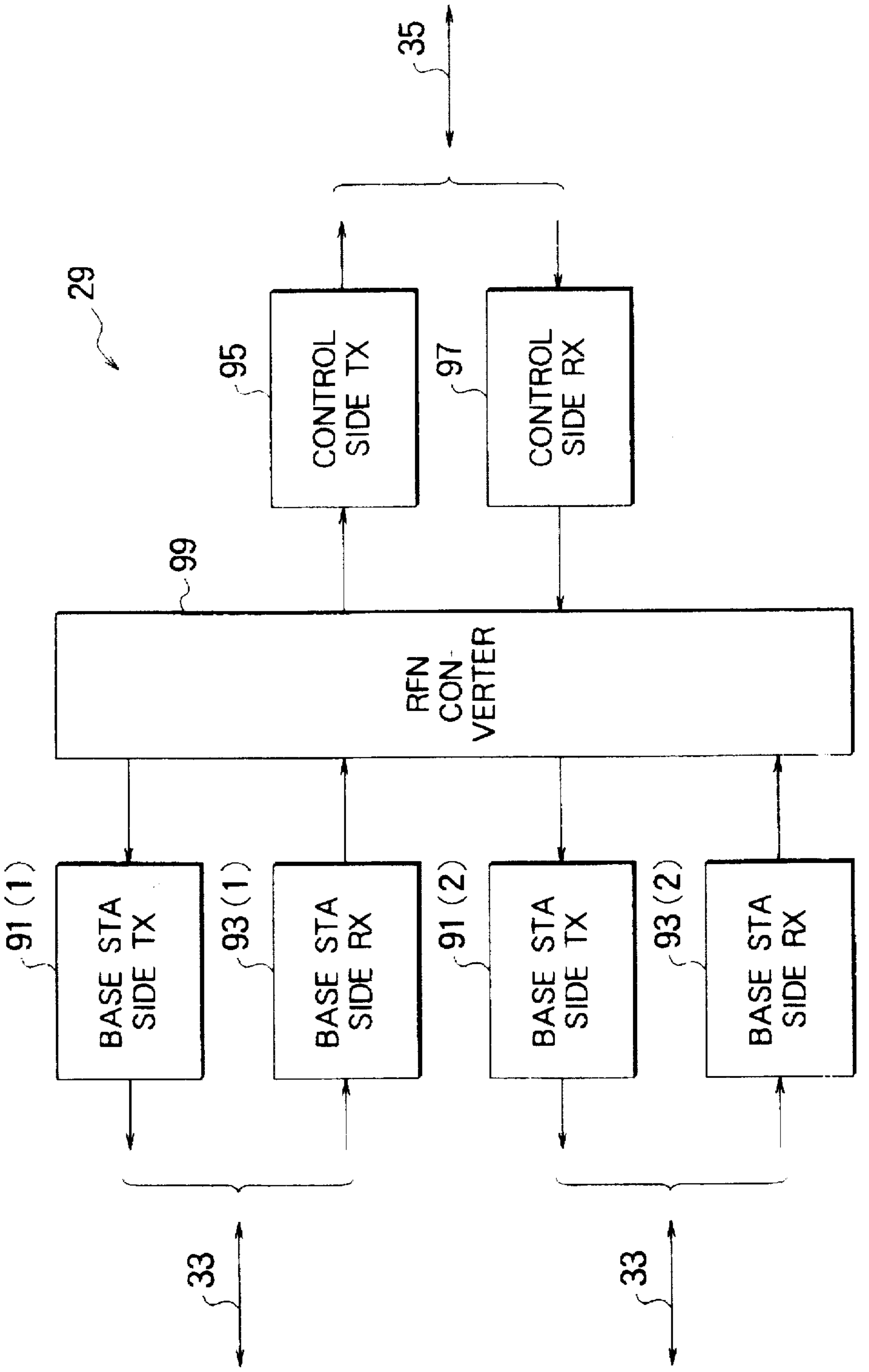
FIG. 18 is a block diagram of an interface conversion unit for use in the mobile communication system mentioned in conjunction with FIG. 8.

Referring afresh to FIG. 18 in addition to FIGS. 1 and 8 through 17, a novel interface conversion unit 29 is used between the base station side interface 33 and the control station side interface 35 for use in processing a bidirectional conversion in the frame format between two sets of the three DSL channels (3DSL) and the HDSL channel used collectively as the base station side interface 33 and the HDSL channel used as the control station side interface 35, between two sets of the HDSL channels (2HDSL) used altogether as the base station side interface 33 and the DS1 channel used as the control station side interface 35, and between four sets of the three DSL channels used altogether as the base station side interface 33 and the DS1 channel used as the control station side interface 35.

Like in the conventional mobile communication system of the type illustrated with reference to FIG. 1, a predetermined station number of base stations 25 are used for each base control station 21. The predetermined station number is equal to the above-described number of sets. It will be assumed in the following that two base stations 25 are connected to two sets of either the three DSL channels or the HDSL channel.

In correspondence to the two base stations 25, the base station side interface 33 transmits first and second downward and first and second upward base station side interface encrypted information data. The first or the second downward or upward base station side interface encrypted information data have a base station side frame format. The control station side interface 35 transmits downward and upward control station side interface encrypted information data of a control station side frame format.

The interface conversion unit 29 comprises first and second base station side transmitters 91 or, more particularly, 91(1) and 91(2), connected to the base station side interface 33. As the first and the second downward base station side interface encrypted information data, these transmitters 91 send first and second downward base station side encrypted information data having the base station side frame format in common. Connected to the base station side interface 33, first and second base station side receivers 93 or 93(1) and 93(2) receive the first and the second upward base station side interface encrypted information data as first and second upward base station side encrypted information data sharing the base station side frame format, respectively.

Connected to the control station side interface 35, a control station side transmitter 95 and a control station side receiver 97 sends upward control station side encrypted information data as the upward control station side interface encrypted information data and receives the downward control station side interface encrypted information data as downward control station side encrypted information data, respectively. The downward and the upward control station side encrypted information data have the control station side frame format in common.

A conversion unit frame format converter 99 converts the downward control station side encrypted information data into the first and the second downward base station side encrypted information data and the first and the second upward base station side encrypted information data into the control station side encrypted information data. It is now readily possible for the frame unit converter 99 to process conversion between the base and the control station side frame formats. The novel interface conversion unit 29 is much simplified in structure.

While this invention has thus far been described in specific conjunction with a sole preferred embodiment thereof and the novel base station, base control station, mobile station, frame formats, and interface conversion unit, it will now be possible for one skilled in the art to carry this invention into practice in various other manners. Above all, it is possible to use the encryption keys either in place of or in combination with the radio frame numbers. When the radio frame numbers are not used as the encryption keys, it is possible in the mobile communication system of this invention to use mobile stations currently available on the market for use in the WACS system.

What is claimed is:

1. A mobile communication system comprising a base station interface between a base station and a base control station connected to a fixed communication network and a radio interface between said base station and a mobile station, said base control station and said mobile station comprising terminating means for terminating station encrypted information data sent through said base station interface to and from said base station and through said radio interface from and to said mobile station in a time division multiplex access fashion, said base station comprising transmitting means for transmitting said station encrypted information data through said radio interface, said base station interface comprising a digital transmission channel for transmitting base station interface encrypted information data of a predetermined transmission capacity in multiframes, each multiframe being composed of at least one submultiframe, each submultiframe being composed of first through twentieth frames, each frame being composed of first through N-th bits, where N represents a predetermined bit number, the first bit being used as a frame synchronizing bit between said base station and said base control station, wherein the second through the N-th bits are used in transmitting said station encrypted information data through said base station interface and said radio interface.

2. A mobile communication system as claimed in claim 1, said base station interface comprising collectively as said digital transmission channel three subscriber line channels, each having 144 kbits/s as said predetermined transmission capacity, said at least one submultiframe being one in number, said predetermined bit number being equal to eighteen, wherein:

the second bit is used as a maintenance bit for said base station and said base control station;

the third through the eighteenth bits being used for the station encrypted information data transmitted through said base station interface and said radio interface.

3. A mobile communication system as claimed in claim 2, said base station interface encrypted information data being downward base station interface encrypted information data transmitted from said base station to said mobile station, wherein the third through the eighteenth bits of the first through the nineteenth frames and the third through the thirteenth bits of the twentieth frame are divided into first through third equal parts with the fourteenth through the eighteenth bits of the twentieth frame used for reservation bits, each part consisting of one hundred and five bits, twenty-four bits of said one hundred and five bits being used for the control information data including radio frame numbers, eighty bits of said one hundred and five bits being used for encrypted data of said downward base station interface encrypted information data, one bit of said one hundred and five bits being used as a power control unit for said mobile station.

4. A mobile communication system as claimed in claim 3, wherein three bits of said twenty-four bits are used in said first through said third parts in said radio frame numbers.

5. A mobile communication system as claimed in claim 2, said base station interface encrypted information data being upward base station interface encrypted information data transmitted from said mobile station towards said base station, wherein the third through the eighteenth bits of the first through the nineteenth frames and the third through the thirteenth bits of the twentieth frame are divided into first through third equal parts with the fourteenth through the eighteenth bits of the twentieth frame used for reservation bits, each part consisting of one hundred and five bits, the twenty-four bits of said one hundred and five bits being used for the control information data of said user's and control information data, eighty bits of said one hundred and five bits being used for encrypted data of said upward base station interface encrypted information data, one bit of said one hundred and five bits being used in said first through said third equal parts for radio frame numbers.

6. A mobile communication system as claimed in claim 1, further comprising an interface conversion unit between said base station and said base control station to divide said base station interface into base and control station side interfaces, the digital transmission channel of said base and said control station side interfaces being a high bit-rate subscriber line channel having 766 kbit/s as said predetermined transmission capacity, said at least one submultiframe being first and second submultiframes, said predetermined bit number being equal to forty-eight, each multiframe further comprising a zeroth bit for use as a framing bit in common to said first and said second submuitiframes to precede the first bit of said first submultiframe, wherein:

the second bit is used as a maintenance bit between said base station and said base control station;

the third through the forty-fourth bits being used for the station encrypted information data transmitted through said base and said control station side interfaces and said radio interface;

the forty-fifth through the forty-eighth bits being used as maintenance and control bits for said interface conversion unit.

7. A mobile communication system as claimed in claim 6, said base station interface encrypted information data being downward base station interface encrypted information data transmitted from said base station to said mobile station, wherein the third through the eighteenth bits of the first through the nineteenth frames and the third through the thirteenth bits of the twentieth frame are divided into first through eighth equal parts with each part composed of one hundred and five bits, twenty-four bits of said one hundred and five bits being used for the control information data including radio frame numbers, eighty bits of said one hundred and five bits being used for encrypted data of said downward base station interface encrypted information data, one bit of said one hundred and five bits being used as a power control bit for said mobile station.

8. A mobile communication system as claimed in claim 7, wherein three bits of said one hundred and five bits are used in said first through said eighth equal parts for said radio frame numbers.

9. A mobile communication system as claimed in claim 6, said base station interface encrypted information data being upward base station interface encrypted information data transmitted from said mobile station towards said base station, wherein the third through the forty-fourth bits of the first through the twentieth frames are divided into first through eighth equal parts with each part composed of one hundred and five bits, twenty-four bits of said one hundred and five bits being used for the control information data, eighty bits of said one hundred and five bits being used for encrypted data of said upward base station interface encrypted information data, one bit of said one hundred and five bits being used in said first through said eighth equal parts being used for radio frame numbers.

10. A mobile communication system as claimed in claim 1, further comprising an interface conversion unit between said base station and said base control station to divide said base station interface into base and control station side interfaces, the digital transmission channel of said base and said control station side interfaces being a subscriber line 1 channel having 1.544 Mbit/s as said predetermined transmission capacity, said at least one submultiframe being first to fourth submultiframes, said predetermined bit number being equal to forty-eight, each submultiframe further comprising a zeroth bit for use as a framing bit in common to said first through said fourth submultiframes to precede the first bit of said first submultiframe, wherein:

the second bit is used as a maintenance bit between said base station and said base control station;

the third through the forty-fourth bits being used for the station encrypted information data transmitted through said base and said control station side interfaces and said radio interface;

the forty-fifth through the forty-eighth bits being used as maintenance and control bits for said interface conversion unit.

11. A mobile communication system as claimed in claim 10, said base station interface encrypted information data being downward base station interface encrypted information data transmitted from said base station to said mobile station, wherein the third through the forty-fourth bits of the first through the twentieth frames are divided into first through eighth equal parts with each part composed of one hundred and five bits, twenty-four bits of said one hundred and five bits being used for the control information data including radio frame numbers, eighty bits of said one hundred and five bits being used for encrypted data of said downward base station interface encrypted information data, one bit of said one hundred and five bits being used as a power control bit for said mobile station.

12. A mobile communication system as claimed in claim 11, wherein three bits of said twenty-four bits are used in said first through said eighth equal parts for radio frame numbers.

13. A mobile communication system as claimed in claim 11, said base station interface encrypted information data being upward base station interface encrypted information data transmitted from said mobile station towards said base station, wherein the third through the forty-fourth bits of the first through the twentieth frames are divided into first through eighth equal parts with each part composed of one hundred and five bits, twenty-four bits of said one hundred and five bits being used for the control information data, eighty bits of said one hundred and five bits being used for encrypted data of said upward base station interface encrypted information data, one bit of said one hundred and five bits being used in said first through said eighth equal parts for radio frame numbers.

14. A base station for use in a mobile communication system comprising a base station interface between said base station and a base control station connected to a fixed communication network and a radio interface between said base station and a mobile station, said base station comprising base station interface transmitting means for transmitting base station encrypted information data from and to said base station interface in base station interface encrypted information data, radio interface transmitting means for transmitting base station transmission information data to and from said radio interface in radio interface encrypted information data, and base station conversion processing means for processing conversion between said base station encrypted information data and said base station transmission information data, wherein said base station conversion processing means comprises radio frame number processing means for processing radio frame numbers in said base station encrypted information data and in said base station transmission information data.

15. A base station as claimed in claim 14, said base station encrypted information data comprising downward and upward base station encrypted information data, said base station interface encrypted information data comprising downward and base station interface encrypted information data transmitted from and to said base station interface, respectively, said radio interface encrypted information data comprising downward and upward radio interface encrypted information data transmitted from and to said radio interface, respectively, and including base station downward and upward transmission information data, respectively, said base station interface transmitting means comprising a base station downward receiver for receiving said downward base station interface encrypted information data as said downward base station encrypted information data and a base station upward transmitter for transmitting said upward base station encrypted information data as said upward base station interface encrypted information data, said radio interface transmitting means comprising a base station downward transmitter for transmitting said base station downward transmission information data as said downward radio interface encrypted information data and a base station receiver for receiving said upward radio interface encrypted information data as said base station upward transmission information data, said base station conversion processing means comprising a base station transmission frame controller for processing said downward base station encrypted information data into said base station downward transmission information data and a base station reception frame controller for processing said base station upward transmission information data into said upward base station encrypted information data, wherein said radio frame number processing means is for reading for storage as stored frame numbers the radio frame numbers used in said base station transmission controller on processing said downward base station encrypted information data into said base station downward transmission information data and for delivering said stored frame numbers to said base station reception frame controller for use on processing said base station upward transmission information data into said upward base station encrypted information data.

16. A base control station for use in a mobile communication system comprising a base station interface between a base station and said base control station with said base control station connected to a fixed communication network and a radio interface between said base station and a mobile station, said base control station comprising base station interface transmitting means for transmitting control station encrypted information data to and from said base station interface in base station interface encrypted information data, control station encryption processing means for processing conversion between user's and control information data and control station transmission information data, and control station conversion processing means for processing conversion between said control station encrypted information data and said control station transmission information data by using radio frame numbers, wherein said control station conversion processing means comprises radio frame number processing means for processing radio frame numbers in said base station interface encrypted information data and for said user's and control information data.

17. A base control station as claimed in claim 16, said control station encrypted information data comprising downward and upward control station encrypted information data, said base station interface encrypted information data comprising downward and upward base station interface encrypted information data transmitted to and from said base station interface, respectively, said user's and control information data comprising downward and upward user's and control information data, said radio frame numbers comprising downward and upward radio frame numbers, said base station interface transmitting means comprising a control station transmitter for transmitting said downward control station encrypted information data as said downward base station interface encrypted information data and a control station receiver for receiving said upward base station interface encrypted information data as said upward control station encrypted information data, said control station encryption processing means comprising a control station encrypt processor for processing said downward user's and control information data by said downward radio frame numbers into control station downward transmission information data and a control station decrypt processor for processing control station upward transmission information data by said downward radio frame numbers into said upward user's and control information data, said control station conversion processing means comprising a control station transmission information controller for processing said control station downward transmission information data and said downward radio frame numbers into said downward control station encrypted information data and a control station reception information controller for processing said upward control station encrypted information data into said control station upward transmission information data, wherein said radio frame number processing means is for reading said upward radio frame numbers from said upward control station encrypted information data for supply to said control station decrypt processor in place of said downward radio frame numbers.

18. A mobile station for use in a mobile communication system comprising a base station interface between a base station and a base control station connected to a fixed communication network and a radio interface between said base station and said mobile station, said mobile station comprising radio interface transmitting means for transmitting mobile'station encrypted information data to and from said radio interface in radio interface encrypted information data, mobile station encryption processing means for processing conversion between user's and control information data and mobile station transmission information data, and mobile station conversion processing means for processing conversion between said mobile station encrypted information data and said mobile station transmission information data by using radio frame numbers, wherein said mobile station conversion processing means comprises radio frame number processing means for allowing use of any one of said radio frame numbers on processing conversion from said user's and control information data to said mobile station transmission information data.

19. A mobile station as claimed in claim 18, said mobile station encrypted information data comprising downward and upward mobile station encrypted information data, said radio interface encrypted information data comprising downward and upward radio interface encrypted information data transmitted from and to said radio interface, said user's and control information data comprising downward and upward user's and control information data, said radio frame numbers comprising downward and upward radio frame numbers, said radio interface transmitting means comprising a mobile station receiver for receiving said downward radio interface encrypted information data from said radio interface as said downward mobile station encrypted information data and a mobile station transmitter for transmitting said upward mobile station encrypted information data to said radio interface as said upward radio interface encrypted information data, said mobile station encryption processing means comprising a mobile station decrypt processor for processing mobile station downward transmission information data by using said downward radio frame numbers into said downward user's and control information data and a mobile station encrypt processor for processing said upward user's and control information data into mobile station upward transmission information data by using said upward radio frame numbers, said mobile station conversion processing means comprising a mobile station reception information controller for processing conversion of said downward mobile station encrypted information data into said mobile station downward transmission information data and a mobile station transmission information controller for processing conversion of said mobile station upward transmission information data and said upward radio frame numbers into said upward mobile station encrypted information data, wherein said radio frame number processing means reads said downward radio frame numbers from said mobile station downward transmission information data for arbitrary use as said upward radio frame numbers.

20. An interface conversion unit for use in a mobile communication system comprising a base station interface between a predetermined station number of base stations and a base control station connected to a fixed communication network and a radio interface between each of said base stations and a mobile station, said interface conversion unit being interposed between said base stations and said base control station to divide said base station interface into a base station interface connected to each base station for a base station side interface encrypted information data of a base station side frame format and a control station side interface connected to said base control station for a control station side interface encrypted information data of a control station side frame format for conversion between said base and said control station side frame formats, wherein said interface conversion unit comprises frame format converting means for conversion between a first plurality of submultiframes of said base station side frame format and a second plurality of submultiframes of said control station side frame format, where said second plurality is equal to said first plurality times said predetermined station number.

* * * * *